(12) United States Patent
Doi

(10) Patent No.: US 11,641,291 B2
(45) Date of Patent: May 2, 2023

(54) SIGNAL TRANSMISSION DEVICE AND SIGNAL TRANSMISSION METHOD

(71) Applicant: KABUSHIKI KAISHA TOSHIBA, Tokyo (JP)

(72) Inventor: Takashi Doi, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/472,960

(22) Filed: Sep. 13, 2021

(65) Prior Publication Data

US 2022/0294670 A1    Sep. 15, 2022

(30) Foreign Application Priority Data

Mar. 12, 2021    (JP) .............................. JP2021-040711

(51) Int. Cl.
*H04L 25/02*    (2006.01)
*H04N 21/4363*    (2011.01)
*H04B 3/54*    (2006.01)

(52) U.S. Cl.
CPC ......... *H04L 25/0272* (2013.01); *H04B 3/542* (2013.01); *H04N 21/43635* (2013.01); *H04B 2203/545* (2013.01)

(58) Field of Classification Search
CPC .................................................. H04L 25/0272
USPC ........................................................... 375/302
See application file for complete search history.

(56) References Cited

U.S. PATENT DOCUMENTS

| 5,828,326 | A | * | 10/1998 | Kikuchi | ................. | H04N 7/56 |
| | | | | | | 341/59 |
| 9,210,351 | B2 | | 12/2015 | Suzuki et al. | | |
| 11,109,515 | B1 | * | 8/2021 | Nagarajan | ............. | G02B 6/428 |
| 2008/0061837 | A1 | * | 3/2008 | Xu | ................. | H03K 19/018528 |
| | | | | | | 326/127 |
| 2019/0050130 | A1 | * | 2/2019 | Park | ..................... | H04N 5/765 |

FOREIGN PATENT DOCUMENTS

JP         JP 5323238 B1    10/2013

* cited by examiner

*Primary Examiner* — Lihong Yu
(74) *Attorney, Agent, or Firm* — Finnegan, Henderson, Farabow, Garrett & Dunner, LLP

(57) ABSTRACT

According to one embodiment, a signal transmission device AC-coupled with a reception device through a digital transmission line, includes transmitting circuitry configured to transmit a differential signal to the digital transmission line, the differential signal including a first signal and a second signal that are based on an encoded bit serial input signal, wherein absolute values of amplitudes of the first and second signals are 857.14 (mV) or larger.

5 Claims, 11 Drawing Sheets

| TRANSMISSION PATH | DE | INPUT SIGNAL | | OUTPUT SIGNAL |
|---|---|---|---|---|
| | | V-Sync | H-Sync | |
| Ch0 | 0 | | | FOUR KINDS OF 10-BIT CODES |
| Ch1 | 0 | CTL1 | CTL0 | |
| Ch2 | 0 | CTL3 | CTL2 | |
| Ch0 | 1 | B[7:0] | | 256 KINDS OF 10-BIT CODES |
| Ch1 | 1 | G[7:0] | | |
| Ch2 | 1 | R[7:0] | | |

FIG. 3

| TRANSMISSION PATH Ch0 | INPUT SIGNAL | | OUTPUT SIGNAL 10-BIT CODE |
|---|---|---|---|
| | V-Sync | H-Sync | |
| STATE 0 | 0 | 0 | 0010101011 |
| STATE 1 | 0 | 1 | 1101010100 |
| STATE 2 | 1 | 0 | 0010101010 |
| STATE 3 | 1 | 1 | 1101010101 |

FIG. 7

SIGNAL TRANSMISSION DEVICE AND SIGNAL TRANSMISSION METHOD

CROSS REFERENCE TO RELATED APPLICATIONS

This application is based upon and claims the benefit of priority from the prior Japanese Patent Application No. 2021-040711, filed on Mar. 12, 2021, the entire contents of which are incorporated herein by reference.

FIELD

Embodiments described herein relate to a signal transmission device and a signal transmission method.

BACKGROUND

A High-Definition Media Interface (HDMI) specification is a specification of signal transmission between a Digital Versatile Disc (DVD)/set-top box (STB) and a television (TV) through a digital transmission line. In the HDMI specification, pixel signals (each made of eight bits) of three-color components (R, G, and B) of a video signal are each converted (encoded) to 10 bits, and the pixel signals of the three color components converted to 10 bits are serially transmitted through a three-channel transmission path. During a blanking interval of the video signal, a plurality of control signals (each made of two bits) are each converted (encoded) to 10 bits, and the converted control signals are serially transmitted through the three-channel transmission path.

This encoding scheme is referred to as transition-minimized differential signal (TMDS). A TMDS-encoded control signal transmitted during the V blanking interval or H blanking interval of a video signal includes a 10-bit code. The ratio of logic 1 and logic 0 in number of bits among the 10 bits is 6:4 or 4:6.

The HDMI specification uses a scheme in which, when serial transmission is performed between an HDMI transmitter and an HDMI receiver coupled with each other through an HDMI cable, direct-current (DC) coupling is formed between the terminal resistance of the HDMI receiver, which is pulled up to 3.3 V, and the HDMI transmitter. Thus, a high-speed serial drive circuit of the HDMI transmitter is required to have a breakdown voltage characteristic against the pulled-up voltage. There is a request to configure the HDMI transmitter with a high-speed large-scale integrated circuit using a microfabrication technology, but this scheme cannot be applied because breakdown voltage decreases.

Such a large-scale integrated circuit using the microfabrication technology can be used for the HDMI transmitter by forming alternating-current (AC) coupling of the HDMI transmitter and the HDMI receiver through a capacitor inserted therebetween. However, since the ratio of logic 1 and logic 0 in number of bits among the 10 bits is not 5:5 but is 6:4 or 4:6 as described above, DC unbalance occurs between two transmission paths constituting a differential transmission path. This unbalance causes transmission characteristic degradation. This problem can be solved by providing a signal correction circuit, but this method leads to increase in mounting cost due to increase in the number of pins.

BRIEF DESCRIPTION OF THE DRAWINGS

FIG. 3 is a diagram illustrating a table of the correspondence among an input signal, a transmission channel, and an output signal;

FIG. 7 is a diagram illustrating the correspondence relation among the bit values of V-Sync and H-Sync and an encoded value.

DETAILED DESCRIPTION

According to one embodiment, a signal transmission device AC-coupled with a reception device through a digital transmission line, includes transmitting circuitry configured to transmit a differential signal to the digital transmission line, the differential signal including a first signal and a second signal that are based on an encoded bit serial input signal, wherein absolute values of amplitudes of the first and second signals are 857.14 (mV) or larger.

An embodiment of the present invention will be described below with reference to the accompanying drawings. Before the description of the embodiment of the present invention, a comparative example of the present embodiment will be described below with reference to FIGS. 1 to 8.

Figure 1:
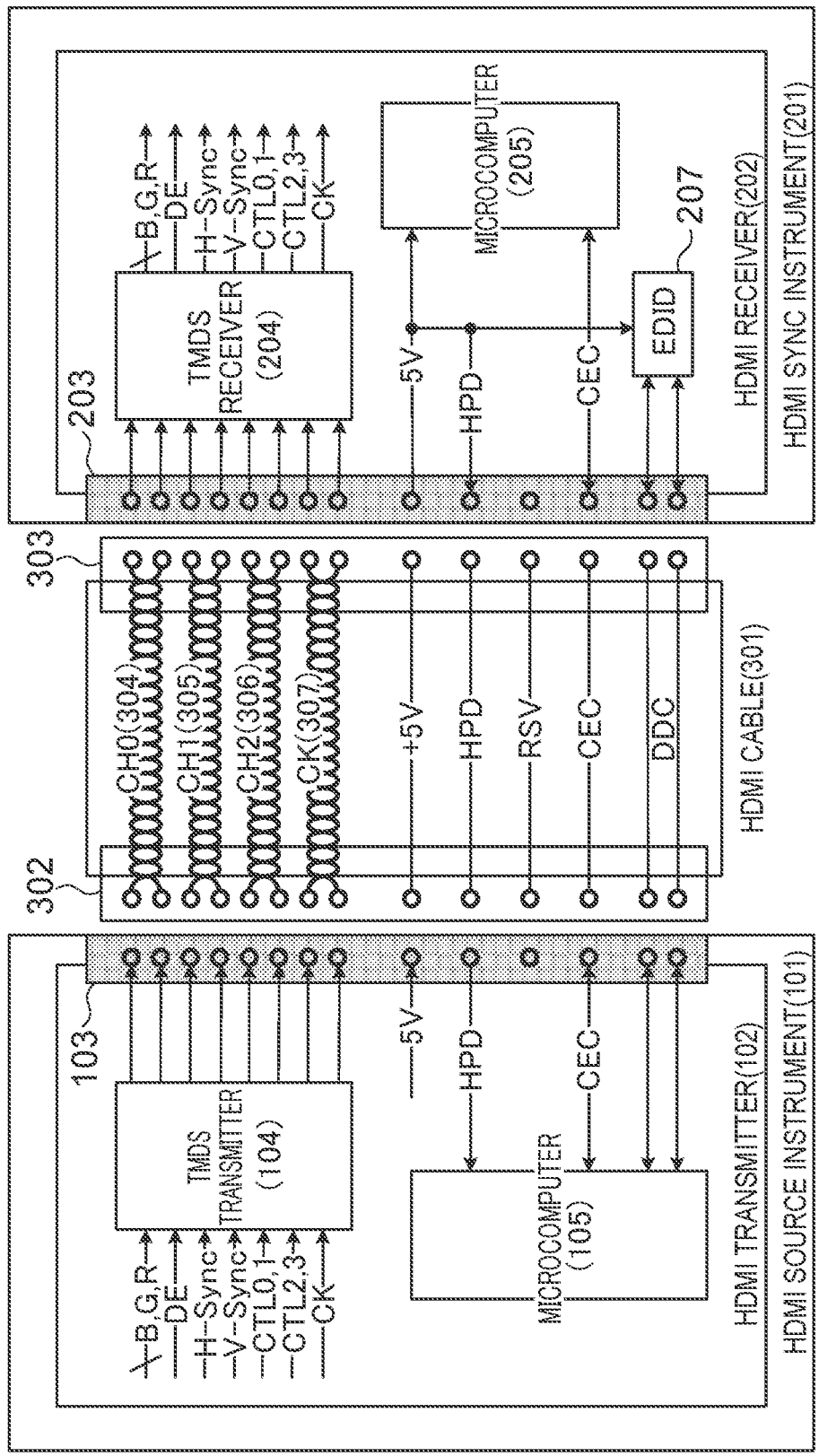
FIG. 1 is a block diagram of an HDMI transmission system according to a comparative example of the present embodiment.

FIG. 1 is a block diagram of an HDMI transmission system according to the comparative example of the present embodiment. FIG. 1 corresponds to FIG. 1 disclosed in Patent Literature 1. The HDMI transmission system includes an HDMI source instrument 101, an HDMI sync instrument 201, and an HDMI cable 301 connecting the instruments. The HDMI source instrument 101 is an instrument, such as a DVD player, configured to reproduce a signal of at least one of video and audio. The HDMI sync instrument 201 is an instrument, such as a TV receiver, configured to receive a signal from the HDMI source instrument 101 through the HDMI cable 301 and output video and audio. The HDMI cable 301 includes a plurality of signal lines. The plurality of signal lines include a 5V line, an HPD line, an RSV line, a CEC line, a DDC line, a channel 0 (Ch0) line 304, a channel 1 (Ch1) line 305, a channel 2 (Ch2) line 306, and a clock (CK) line 307.

The HDMI source instrument 101 includes an HDMI transmitter 102, a TMDS transmitter (TMDS transmitting circuitry) 104, and a microcomputer 105. The HDMI transmitter (HDMI transmitting circuitry) 102, the TMDS transmitter 104, and the microcomputer 105 are connected with an HDMI terminal 103. The HDMI terminal 103 includes a plurality of various terminals. The HDMI terminal 103 is connected with the HDMI sync instrument 201 through a plurality of signal lines in the HDMI cable 301. In other words, the HDMI transmitter 102, the TMDS transmitter 104, and the microcomputer 105 are connected with the HDMI sync instrument 201 through the plurality of signal lines.

The HDMI sync instrument 201 includes an HDMI receiver (HDMI receiving circuitry) 202, a TMDS receiver (TMDS receiving circuitry) 204, a microcomputer 205, and an EDID memory 207. The EDID memory 207 stores coded data of a display characteristic capability of the HDMI sync instrument 201. The HDMI receiver 202, the TMDS receiver 204, the microcomputer 205, and the EDID memory 207 are connected with an HDMI terminal 203. The HDMI terminal 203 includes a plurality of various terminals. The HDMI terminal 203 is connected with the HDMI source instrument 101 through a plurality of signal lines in the HDMI cable 301. In other words, the HDMI receiver 202, the TMDS receiver 204, the microcomputer 205, and the EDID memory 207 are connected with the HDMI source instrument 101 through the plurality of signal lines.

The microcomputer 105 of the HDMI transmitter 102 in the HDMI source instrument 101 has a function to detect, through an HDP signal line, connection with the HDMI sync instrument 201 and the HDMI cable 301. The microcomputer 105 also has a function to read data in the EDID memory 207 of the HDMI sync instrument 201 through the DDC line of the HDMI cable 301. The microcomputer 105 also has a function to communicate with the microcomputer 205 of the HDMI sync instrument 201 through the CEC line of the HDMI cable.

The microcomputer 205 of the HDMI receiver 202 in the HDMI sync instrument 201 has a function to detect a state in which the HDMI source instrument 101 and the HDMI cable 301 are connected through the 5V line and the HDMI source instrument 101 is activated upon power-on. The microcomputer 205 has a function to communicate with the microcomputer 105 of the HDMI source instrument 101 through the CEC line of the HDMI cable.

Figure 2:
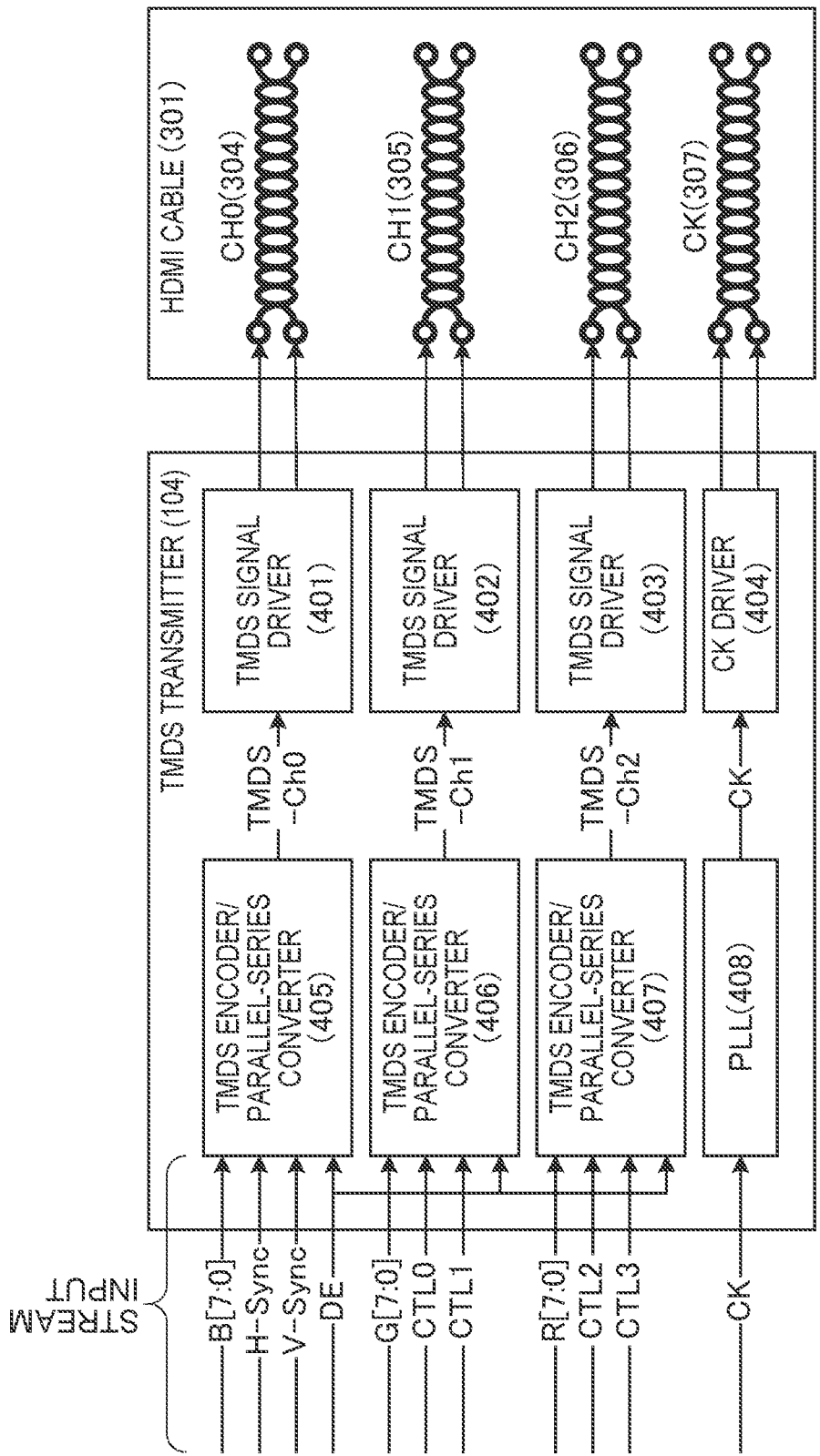
FIG. 2 is a block diagram of a TMDS transmitter.

FIG. 2 is a block diagram of the TMDS transmitter 104. FIG. 2 also illustrates part of the HDMI cable 301. The TMDS transmitter 104 includes TMDS signal drivers 401, 402, and 403, a CK driver 404, TMDS encoder/parallel-series converters 405, 406, and 407, and a phase-locked loop (PLL) 408. FIG. 2 corresponds to FIG. 2 in Patent Literature 1.

The TMDS encoder/parallel-series converters 405, 406, and 407 each receive eight bits of the corresponding one of three pixel color components (R[7:0], G[7:0], B[7:0]) of an image signal as a transmitted video signal. The TMDS encoder/parallel-series converters 405, 406, and 407 each generate 10-bit serial data through conversion (TMDS encoding) of the received eight bits into 10 bits. This encoding scheme is referred to as transition-minimized differential signal (TMDS). The 10-bit serial data of the three color components (R, G, B) is provided to the TMDS signal drivers 401, 402, and 403 as data (TMDS-Ch0, TMDS-Ch1, and TMDS-Ch2) of transmission channels Ch0, Ch1, and Ch2. The TMDS signal drivers 401, 402, and 403 convert the provided TMDS-Ch0, TMDS-Ch1, and TMDS-Ch2 into differential signals, respectively. The TMDS signal drivers 401, 402, and 403 transmit the differential signals obtained through the conversion to the HDMI sync instrument 201 through the Ch0 signal line 304, the Ch1 signal line 305, and the Ch2 signal line 306 in the HDMI cable 301.

The TMDS encoder/parallel-series converters 405, 406, and 407 receive video blanking signals (H-Sync (H synchronization signal) and V-Sync (V synchronization signal)) and control signals CTL0, CTL1, CTL2, and CTL3. In addition, a DE (data enable) signal is supplied to the TMDS encoder/parallel-series converters 405, 406, and 407 in common. The TMDS encoder/parallel-series converters 405, 406, and 407 distinguish the video blanking signals, the control signals, and the above-described image signals (R[7:0], G[7:0], B[7:0]) based on the DE signal. The TMDS encoder/parallel-series converter 405 converts two bits of H-Sync and V-Sync into 10-bit serial data. The TMDS signal driver 401 converts the 10-bit serial data into a differential signal and transmits the differential signal obtained through the conversion to the HDMI sync instrument 201 through the Ch0 signal line 304 in the HDMI cable 301.

FIG. 3 illustrates a table of the correspondence among a signal (control signal, video blanking signal, and image signal) input to a TMDS encoder/parallel-series converter, a transmission path (transmission channel) to which the signal is mapped, and an output signal into which the signal is converted. The input signal is the video blanking signals or control signals when the DE signal indicates logic 0, or the input signal is an image signal when the DE signal indicates logic 1.

Figure 4:
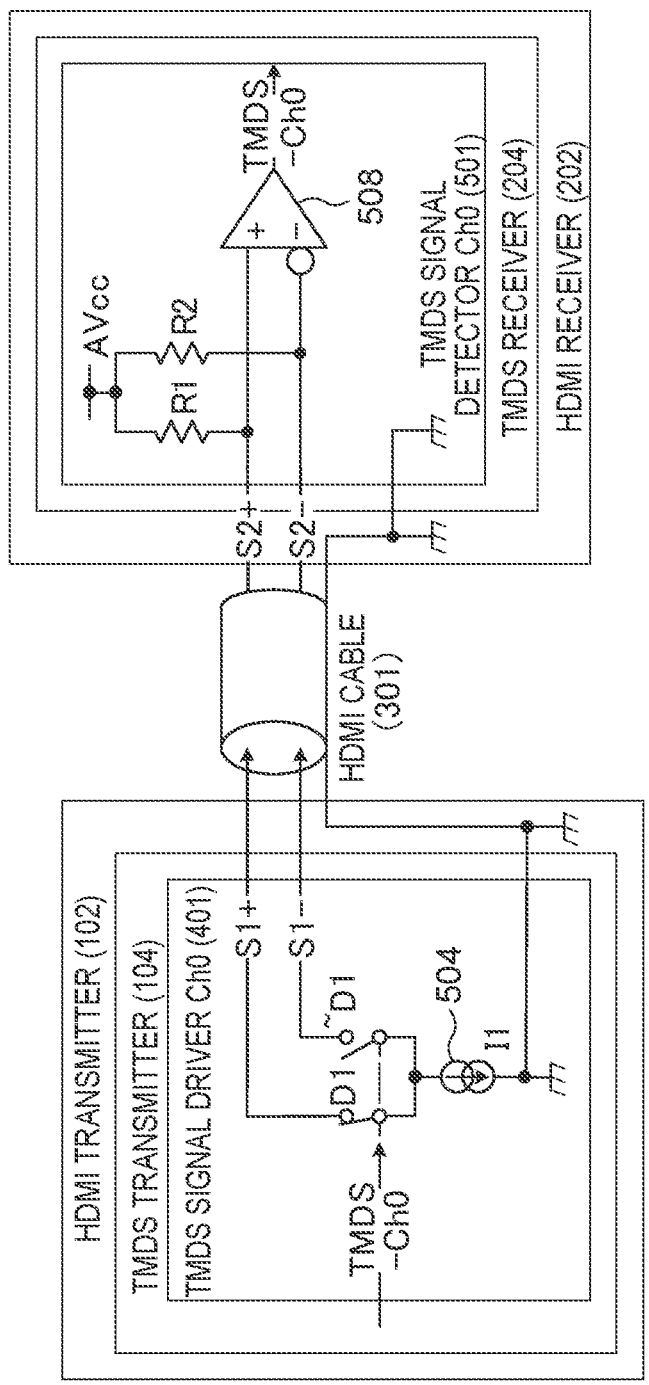
FIG. 4 is a diagram illustrating an exemplary detailed configuration of a TMDS signal driver and a TMDS signal detector.

FIG. 4 illustrates an exemplary detailed configuration of the TMDS signal driver 401 of Ch0, which is included in the TMDS transmitter 104 illustrated in FIGS. 1 and 2, and a TMDS signal detector 501 of Ch0, which is included in the TMDS receiver 204 illustrated in FIG. 1. The TMDS signal driver 401 and the TMDS signal detector 501 are connected with each other through the Ch0 signal line 304 in the HDMI cable. Although FIG. 4 illustrates the configuration corresponding to Ch0, the same configuration is provided for Ch1, Ch2, and CK.

The TMDS signal driver 401 includes a switch D1, a switch ~D1, and a current source 504. The switch D1 receives a TMDS-Ch0 signal that is bit serial data from the TMDS encoder/parallel-series converter 405, and switches and connects the current source 504 to a "+" signal line in the Ch0 signal line ("+" signal line and "−" signal line) of the HDMI cable. The signal of current I1 supplied from the current source 504 to the "+" signal line is written as signal "S1+". The switch ~D1 operates in a reverse phase with respect to that of the switch D1 and switches and connects the current source 504 to the "−" signal line in the Ch0 signal line ("+" signal line and "−" signal line) of the HDMI cable. The signal of current I1 supplied from the current source 504 to the "−" signal line is written as signal "S1−". In this manner, the switch ~D1 and the switch D1 alternately turn the current source 504 on and off in accordance with the logic of the TMDS-Ch0 signal as bit serial data. Current I1 from the current source, which is alternately output as signals "S1+" and "S1−", is transmitted as a differential signal to the HDMI receiver 202 of the HDMI sync instrument 201 through the Ch0 signal line 304 (including the "+" signal line and the "−" signal line) of the HDMI cable.

The Ch0 signal line 304 (including the "+" signal line and the "−" signal line) is connected with differential input terminals ("+" terminal and "−" terminal) of a differential amplifier 508 of the TMDS signal detector 501 of Ch0. The "+" signal line is connected with one end of a resistor R1, and the "−" signal line is connected with one end of a resistor R2. The other end of each of the resistors R1 and R2 is connected with a power source AVcc. The resistance values of the resistors R1 and R2 are, for example, same. Signals transmitted through the Ch0 signal line 304 (including the "+" signal line and the "−" signal line) are supplied as a signal "S2+" and a signal "S2−" to the differential input terminals ("+" terminal and "−" terminal). The voltage value of the power source AVcc is represented by a reference sign AVcc, which is same as that of the power source.

Accordingly, the TMDS-Ch0 bit serial data from the TMDS transmitter 104 is transferred to a later stage as the TMDS-Ch0 signal through the differential amplifier 508 of the TMDS signal detector 501 of Ch0 in the TMDS receiver 204.

Output terminals ("S+" terminal and "S−" terminal) of the signals "S1+" and "S1−" output from the TMDS signal driver 401 of Ch0 are connected with the resistors R1 and R2 through the Ch0 signal line (including the "+" signal line and the "−" signal line) of the HDMI cable. Accordingly, the voltage of the power source AVcc of the HDMI receiver 202 is applied to the output terminals of the signals "S1+" and "S1−". The power source AVcc is, for example, 3.3 V, which is defined by an interface standard. The TMDS transmitter 104 is achieved by an integrated circuit, but a breakdown voltage characteristic corresponding to the voltage 3.3 V cannot be satisfied when using a microfabrication technology for a higher-speed large-scale integrated circuit, and thus more high-speed high integration is difficult.

Figure 5:
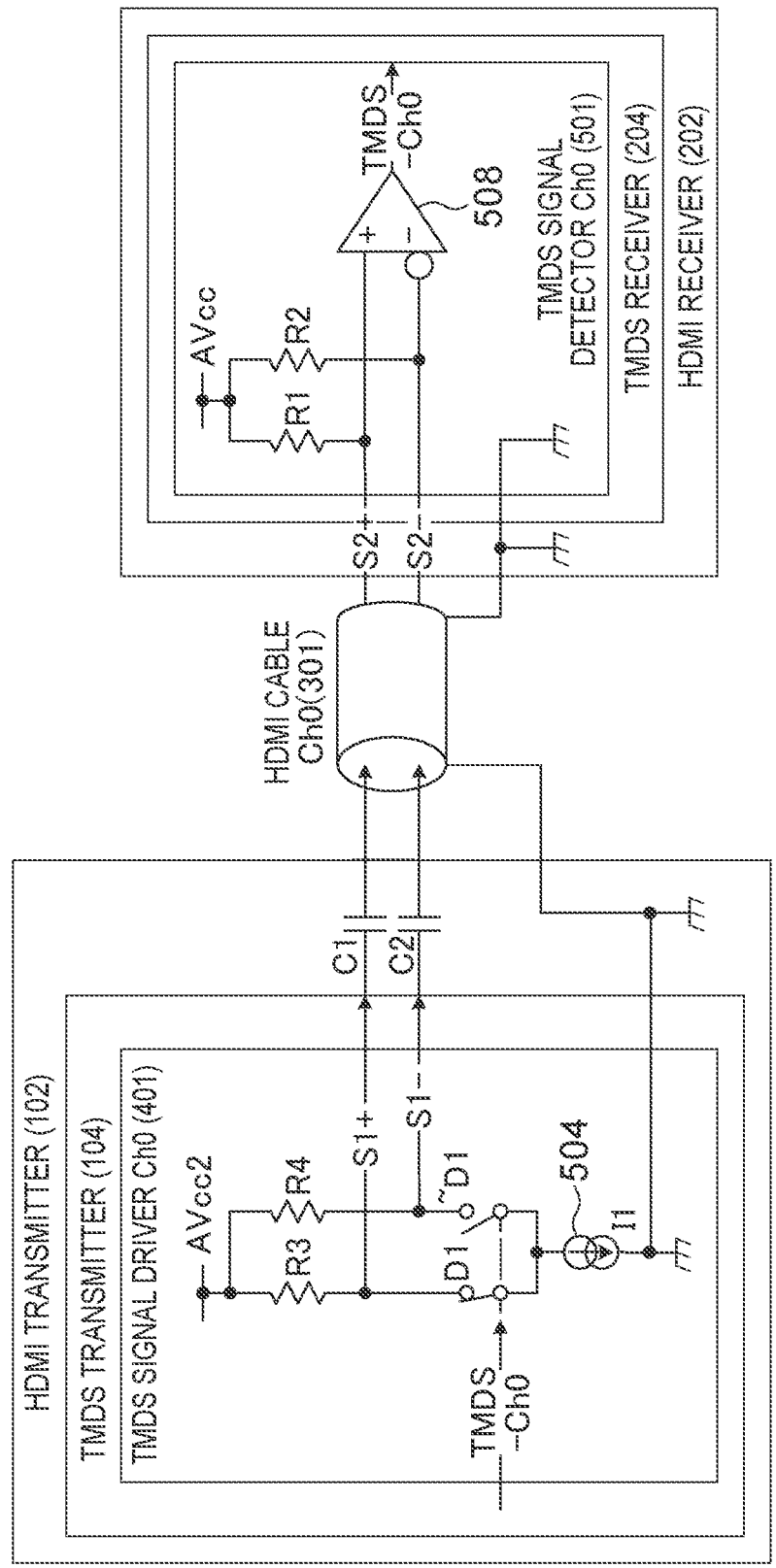
FIG. 5 is a diagram illustrating another exemplary detailed configuration of the TMDS signal driver and the TMDS signal detector.

FIG. 5 illustrates another exemplary detailed configuration of the TMDS signal driver 401 of Ch0, which is included in the TMDS transmitter 104 illustrated in FIGS. 1 and 2, and the TMDS signal detector 501 of Ch0, which is included in the TMDS receiver 204 illustrated in FIG. 1. A configuration related to the TMDS signal driver 401 of Ch0 is partially different from that in FIG. 4, and the other configuration is same as that in FIG. 4.

A capacitor C1 and a capacitor C2 are provided halfway through wires connecting the TMDS transmitter 104 in the HDMI transmitter 102 and the Ch0 signal line ("+" and "−" signal lines) of the HDMI cable 301. Accordingly, the HDMI transmitter 102 is AC-coupled with the HDMI cable 301 or the HDMI receiver 202. A DC component differs between both ends of each capacitor because of the AC-coupling. A configuration or scheme for AC-coupling the HDMI transmitter 102 (or the HDMI source instrument) with the HDMI cable 301 (or the HDMI sync instrument or the HDMI receiver 202) is referred to as an AC-coupling configuration or an AC-coupling scheme. The switch D1 and the switch ~D1 in the TMDS signal driver 401 are connected with a power source AVcc2 through a pull-up resistor R3 and a pull-up resistor R4. The voltage of the power source AVcc2 can be determined independently from AVcc on the reception side. Accordingly, breakdown voltage on the transmission side can be decreased, and thus a microfabrication technology for a high-speed large-scale integrated circuit can be used for manufacturing of the HDMI transmitter 102. However, since the ratio of logic 1 and logic 0 in number of bits among the 10 bits of the TMDS-Ch0 serial data is determined to be 6:4 or 4:6, in other words, a ratio not equal to 5:5, DC unbalance occurs to a differential transmission path. Specifically, the DC unbalance occurs between the signal "S2+" and the signal "S2−" transmitted through the differential transmission path after the capacitors C1 and C2. The DC unbalance causes transmission characteristic degradation.

Characteristic degradation due to the DC unbalance will be described below with reference to FIG. 6.

Figure 6:
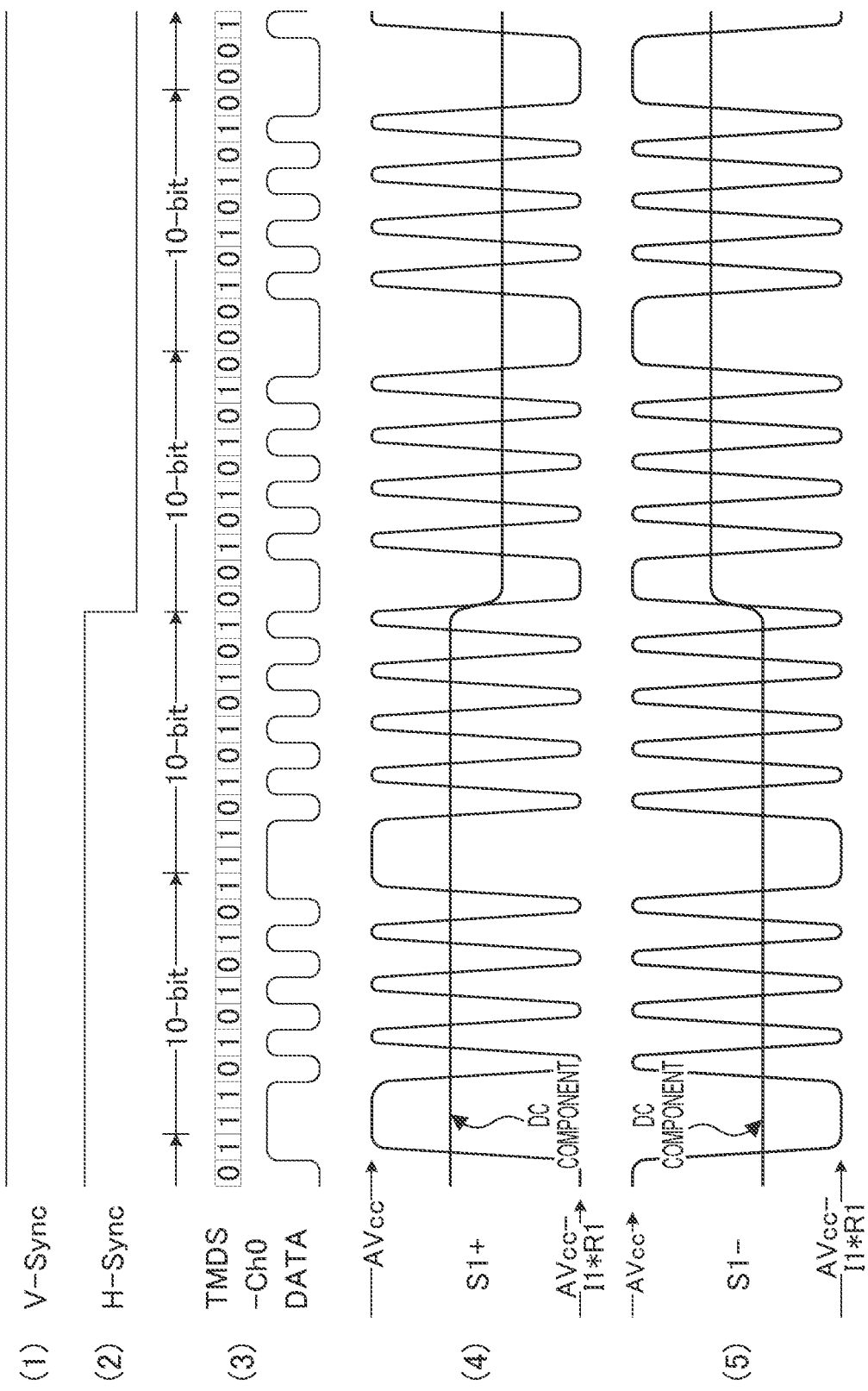
FIG. 6 is a diagram illustrating time charts of the TMDS signal driver.

FIG. 6 illustrates time charts of the TMDS signal driver 401 of Ch0. Waveforms of signals (V-Sync, H-Sync, TMDC-Ch0 data, "S1+", and "S1−") at times before and after the H-Sync signal of a video signal in a blanking interval changes are illustrated. Although not illustrated, DE is at "L" level (logic 0). The time charts illustrated in FIG. 6 correspond to a case in which the TMDS signal driver 401 has the configuration (referred to as DC-coupling configuration) in FIG. 4.

(1) of FIG. 6 illustrates the waveform of V-Sync as the V synchronization signal of the video signal. (2) of FIG. 6 illustrates the waveform of H-Sync as the H synchronization signal of the video signal. V-Sync and H-Sync are inputs to the TMDS transmitter 104 in FIG. 2, more specifically, inputs to the TMDS encoder/parallel-series converter 405. (3) of FIG. 6 illustrates the waveform of TMDS-Ch0 data of bit serial data as an output waveform from the TMDS encoder/parallel-series converter 405. The TMDS-Ch0 data is an input to the TMDS signal driver 401. In (3) of FIG. 6, the logic value and waveform of each bit are illustrated in the units of 10 bit codes in the TMDS-Ch0 data. (4) of FIG. 6 illustrates the waveform of the signal "S1+" corresponding to output data from the "S+" terminal of the TMDS signal driver 401. (5) of FIG. 6 illustrates the waveform of the signal "S1−" corresponding to output data from the "S−" terminal of the TMDS signal driver 401.

FIG. 7 illustrates the correspondence relation among the bit values of V-Sync and H-Sync as input signals to the TMDS encoder/parallel-series converter 405 and an encoded value as an output signal therefrom. The correspondence relation among the input and output signals of the TMDS encoder/parallel-series converter for each transmission channel is illustrated in FIG. 3 described above.

In FIG. 7, when V-Sync is at "H" level (logic 1) and H-Sync is at "H" level (logic 1), the TMDS-Ch0 data corresponds to state 3 and the encoded value is the 10-bit code of "1101010101". When V-Sync is at "H" level and H-Sync is at "L" level, the TMDS-Ch0 data corresponds to state 2 and the encoded value is the 10-bit code of "0010101010". From these values, serial data before and after H-Sync changes from "H" level to "L" level while V-Sync is at "H" level can be specified. Accordingly, the waveform of the TMDS-Ch0 data in (3) of FIG. 6 can be drawn, and in addition, the waveform of the signal "S1+" in (4) of FIG. 6 and the waveform of the signal "S1−" in (5) of FIG. 6 can be drawn.

"H" level corresponding to logic 1 of the signal "S1+" in (4) of FIG. 6 corresponds to a duration in which the switch D1 in FIG. 3 is switched off. "H" level is the potential of AVcc in the TMDS signal detector 501 of Ch0 in FIG. 5. In addition, "L" level for logic 0 corresponds to a duration in which the switch D1 is switched on, and is a potential substantially equal to AVcc−R1*I1. Since the ratio of logic 1 and logic 0 in number changes from 6:4 to 4:6, the average level of the signal "S1+" is AVcc−((AVcc−R1*I1)*6/10)when H-Sync is at "H"level, or AVcc−((AVcc−R1*I1)*4/10)when H-Sync is at "L"level.

The average level is illustrated as a DC component in (4) of FIG. 6. Similarly, a DC component is calculated for the signal "S1−". This DC component is illustrated in (5) of FIG. 6.

The DC components included in the respective signals "S1+" and "S1−" are transmitted to the input of the differential amplifier 508 of the TMDS signal detector 501. Thus, no problem occurs in a case of a DC-coupling configuration as illustrated in FIG. 4. However, in a case of an AC-coupling configuration as illustrated in FIG. 5, the DC components are not transmitted to the input of the differential amplifier 508 since the capacitors C1 and C2 exist halfway through signal transmission. Accordingly, a problem occurs. This problem will be described below with reference to FIG. 8.

Figure 8:
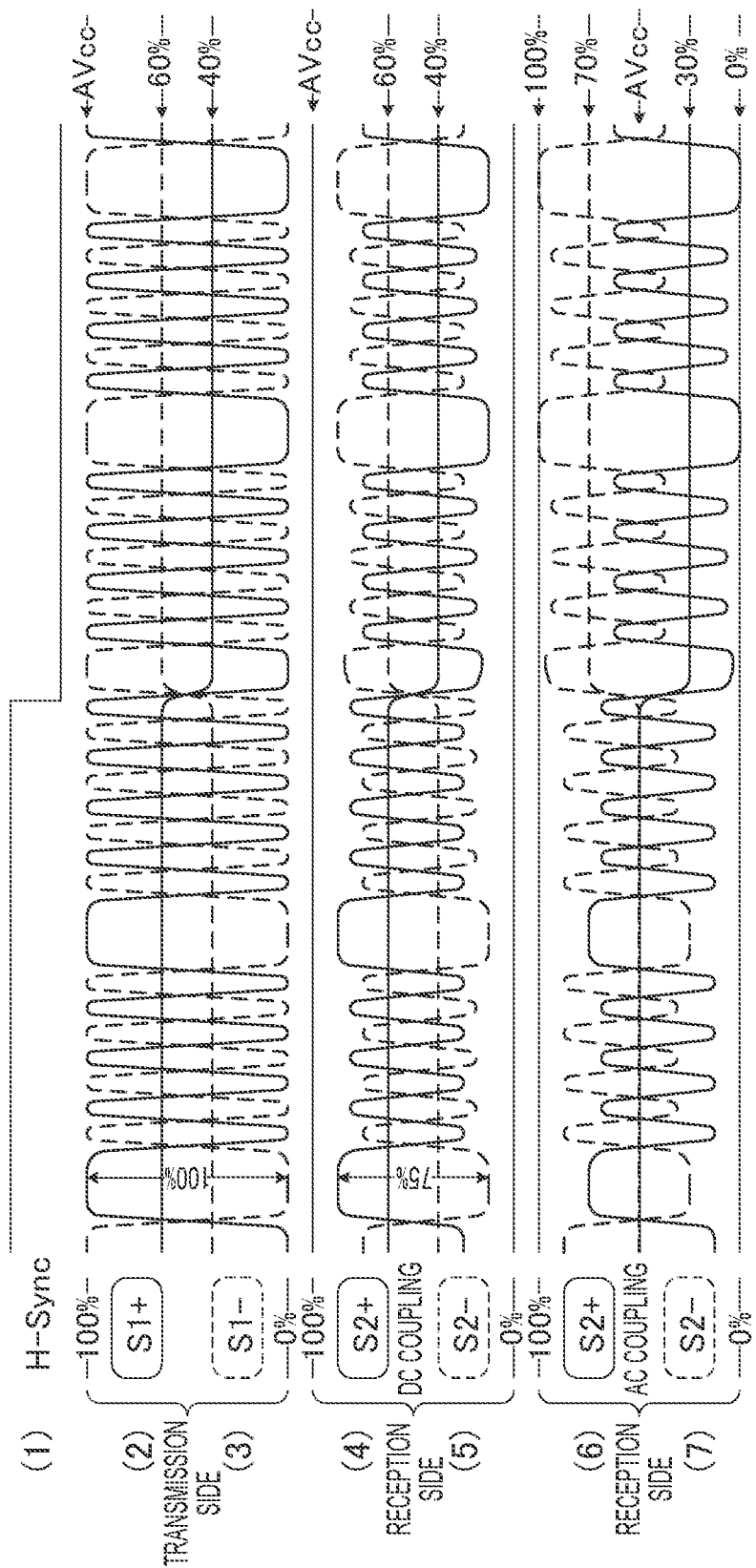
FIG. 8 is a diagram illustrating time charts of signals related to the TMDS signal driver and an HDMI receiver.

FIG. 8 illustrates time charts of signals related to the TMDS signal driver 401 and the HDMI receiver 202. Specifically, (1) of FIG. 8 illustrates the waveform of the H-Sync signal. (2) and (3) of FIG. 8 illustrate, in an overlapping manner, the "S1+" signal (solid line) and the "S1−" signal (dashed line) as a drive output waveform (differential signal output waveform) from the TMDS signal driver 401. In addition, the DC component (horizontal solid line) of the "S1+" signal and the DC component (horizontal dashed line) of the "S1−" signal are illustrated.

(4) of FIG. 8 illustrates the waveform of the "S2+" signal (a signal when the signal "S1+" output from the transmission side is received by a terminal on the reception side, or a signal at a terminal end of the cable) included in a differential signal input waveform to the HDMI receiver 202 in a case of the DC-coupling configuration. (5) of FIG. 8 illustrates the waveform of the "S2−" signal (a signal when the signal "S1−" output from the transmission side is received at a terminal on the reception side, or a signal at a terminal end of the cable) included in the differential signal input waveform. The waveforms in (4) and (5) of FIG. 8 are illustrated in an overlapping manner. The DC component (horizontal solid line) of the "S2+" signal and the DC component (horizontal dashed line) of the "S2−" signal are illustrated as well.

(6) and (7) of FIG. 8 illustrate, in an overlapping manner, the waveforms of the "S2+" and "S2−" signals as a differential signal input waveform to the HDMI receiver 202 in a case of the AC-coupling configuration. In addition, the DC component (horizontal solid line) of the "S2+" signal and the DC component (horizontal dashed line) of the "S2−" signal are illustrated as well. The DC component of the "S1+" signal in (2) of FIG. 8 and the DC component of the "S1−" signal in (3) of FIG. 8 are each at six-tenths (60%) or four-tenths (40%) of a sent signal level. In other words, the DC component of the "S1+" signal and the DC component of the "S1−" signal correspond to ±10% with respect to 50%, which is the common voltage of a differential signal.

The cable has an excellent transmission characteristic for the DC components of the "S2+" signal waveform in (4) of FIG. 8 and the "S2−" signal waveform in (5) of FIG. 8, and thus the DC components have amplitudes (signal levels) equal to the amplitudes of signals ((2) and (3) of FIG. 8) at the terminal on the transmission side. However, a high-frequency component degrades due to the transmission characteristic of the cable. Accordingly, the waveforms of the "S2+" and "S2−" signals degrade and the amplitudes thereof decrease. In the illustrated example, the signal levels decrease to 75% in a case of logic 1 three consecutive times.

In a case of the AC-coupling configuration, the DC component on the reception side converges to the pull-up voltage AVcc (the level of the pull-up voltage AVcc is set to 50% of a maximum signal level on the reception side) of the TMDS signal detector 501 in FIG. 5 because of the capacitors used for AC-coupling. The level of the DC component of the "S1+" signal ((2) of FIG. 8), which is 60% on the transmission side, is 50% as the DC component of the "S2+" signal on the reception side as illustrated in (6) of FIG. 6. Similarly, the level of the DC component on the "S1−" signal, which is 40% on the transmission side is 50% as the DC component of the "S2−" signal on the reception side as illustrated in (7) of FIG. 6. Accordingly, both levels are equal to each other.

The DC component on the reception side changes right after the H-Sync signal in (1) of FIG. 8 changes from "H" level to "L" level. The level of the DC component of the "S2−" signal in (7) of FIG. 8 increases from 50% to 70% by 20%. The level of the DC component of the "S2+" signal in (6) of FIG. 8 decreases from 50% to 30% by 20%. This is because unbalance occurs to charging of the two capacitors since the ratio of logic 1 and logic 0 in number is not equal to 5:5. These increase and decrease eventually converge to the pull-up voltage AVcc (set to the level of 50%) in a convergence time determined based on the capacitor values of the capacitors C1 and C2 and the resistance values of the pull-up resistors R1 and R2. In description below, the resistance values of the pull-up resistors R1 and R2 are represented by reference signs R1 and R2, which are same as those of the pull-up resistances, in some cases.

In a duration (transient state duration) until the pull-up voltage AVcc converges, the level of a differential input signal corresponding to logic 1 or logic 0 (in the illustrated example, logic 1) is lower than in a case of the DC-coupling configuration. In other words, the eye pattern in (6) and (7) of FIG. 8 is narrower than in (4) and (5) of FIG. 8 in a case of the DC-coupling configuration. Thus, a received signal cannot be detected at the differential amplifier 508. Specifically, with the AC-coupling configuration, unlike the DC-coupling configuration, for example, such a problem occurs that a signal cannot be normally detected on the reception side when any DC component included in a transmitted signal changes.

In this manner, when an encoded bit serial signal is transmitted in the AC-coupling configuration while the ratio of logic 1 and logic 0 in number for the signal is different from 5:5, the center level (DC component) of the signal transiently largely varies at a timing when the DC component of the signal changes. Accordingly, the signal cannot be normally detected on the reception side, or the error rate increases.

Figure 9:
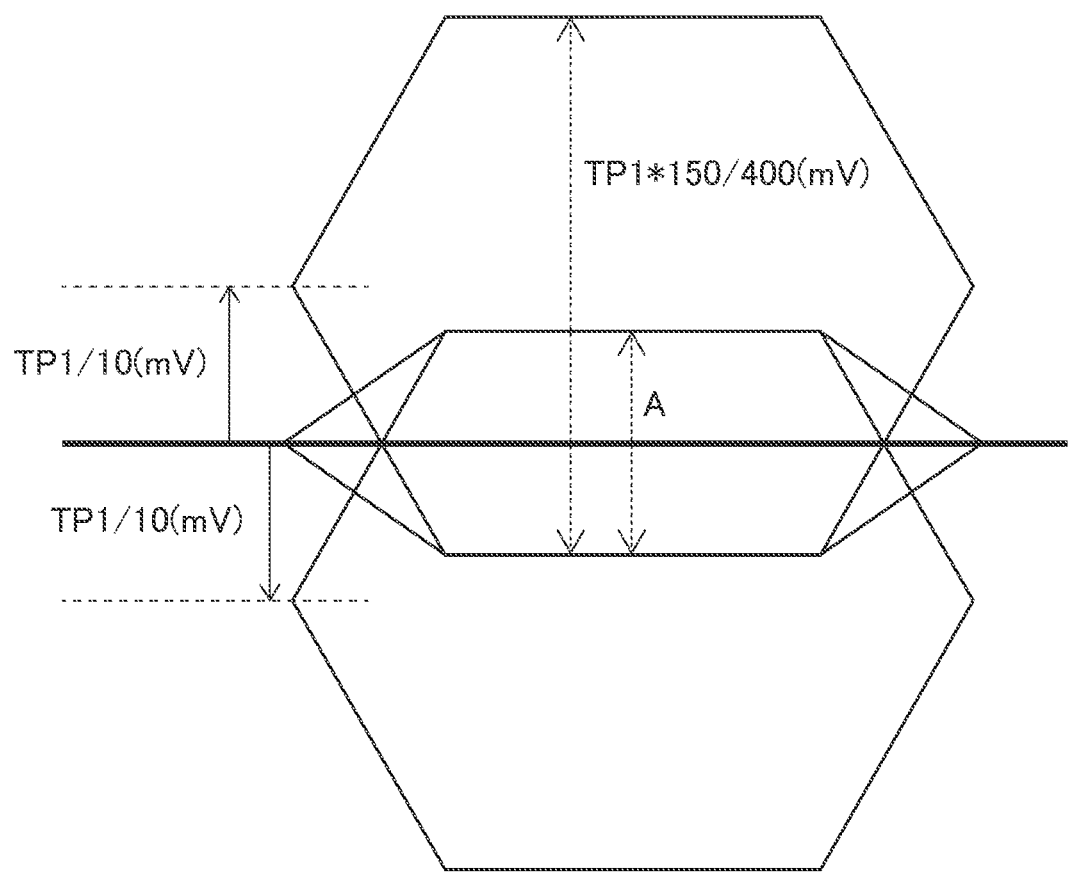
FIG. 9 is an explanatory diagram of the amplitude of a signal waveform on a reception side in an AC-coupling configuration.

FIG. 9 is an explanatory diagram of the amplitude of a signal waveform on the reception side in the AC-coupling configuration. The center of a signal TP1 transmitted from the HDMI source instrument moves in the range of −TP/10 (mV) to TP/10 (mV) along with variation of the DC component. The symbol "I" represents division. It is assumed that this variation has no attenuation through the cable because of a low frequency signal. The amplitude of the signal TP1 can attenuate to TP1*150/400 (mV) ("150/400" corresponds to a maximum attenuation rate allowed by an HDMI standard) on the reception side (at a terminal end on the reception side) through the cable. The amplitude of a differential signal TP2 input to the differential amplifier 508 on the reception side needs to be 150 mV at lowest to normally detect the signal at the differential amplifier 508. Illustrated amplitude "A" indicates the lowest amplitude of the differential signal input to the differential amplifier 508. Amplitude "A" is expressed by TP1*150/400−TP1/10−TP1/10. The symbol "−" represents subtraction. Thus, Expression (1) below needs to be satisfied.

$$TP1*150/400 - TP1/10 - TP1/10 >= 150 (mV) \quad (1)$$

Expression (1) is calculated to obtain TP1>=857.14 (mV).
The voltage or amplitude (Vswing) of a transmitted signal determined by the HDMI standard is 857 (mV) to 1200 (mV) inclusive. Accordingly, 857.14 (mV) is a value allowed by the HDMI standard. Thus, the voltage or amplitude of the transmitted signal TP1 needs to be 857.14 (mV) to 1200 (mV) inclusive.

Figure 10:
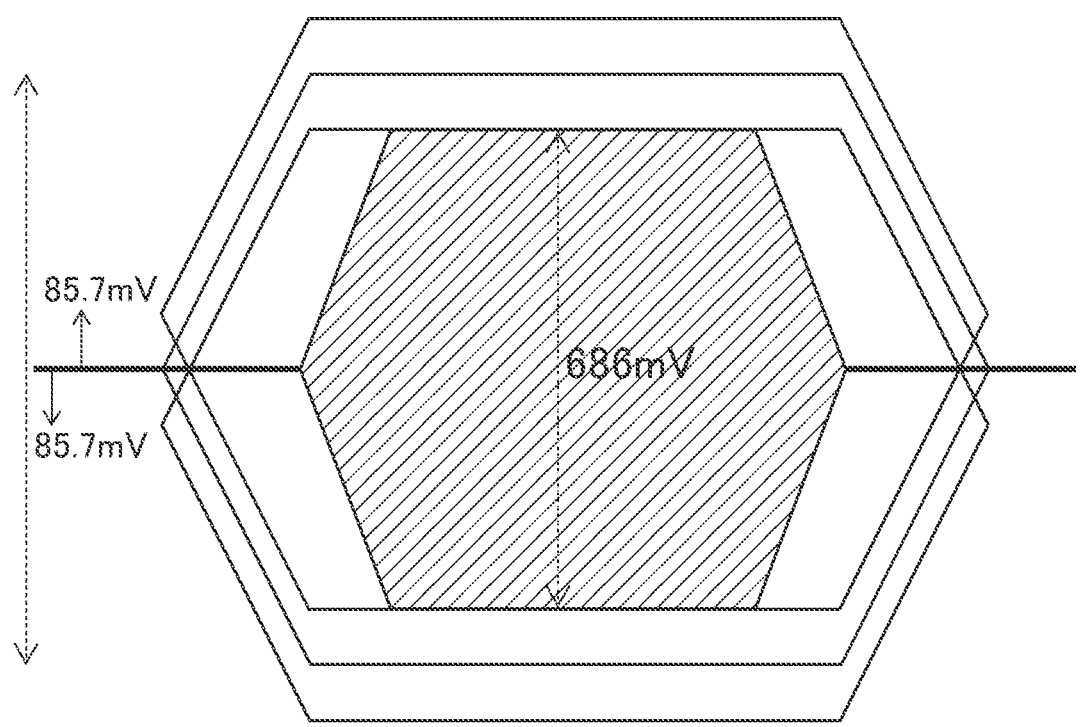
FIG. 10 is a diagram illustrating the amplitude of a differential signal as the difference between signals ("+" signal and "−" signal) on a transmission side.

FIG. 10 illustrates the amplitude of the difference (differential signal on the transmission side) between signals ("+" signal and "−" signal) on the transmission side when the voltage of the signal TP1 is 857.14 (mV). The voltage of 85.7 (mV) is the maximum change amount of the DC component of the transmitted signal. With this change amount, the difference amplitude of the signals is 686 (mV) when the voltage of the signal TP1 is 857.14 (mV). Specifically, $$857.14(mV) - 85.7(mV) - 85.7(mV) = 686(mV) \text{(rounded down to an integer)}$$

is calculated.

Assume that the wavelengths of signals transmitted though data channels (Ch0 to Ch2) are, for example, 0.85 Tbit or longer. The unit "Tbit" stands for the "time duration of a single bit carried across the TMDS data channels". As illustrated in FIG. 1 described above, a TMDS transmission path is constituted by four differential pairs (corresponding to Ch0, Ch1, Ch2, and CK described above). Specifically, one of the pairs is a signal line pair of a clock, and the other three pairs are signal line pairs of the data channels. The clock is a variable rate (25 MHz to 340 MHz), and a data rate is 10 times higher than the clock. Since a time (Tbit) taken for transmission of one bit is variable, the wavelengths of the data channels are expressed by using Tbit in the HDMI standard.

An HDMI transmission system according to the present embodiment has a block diagram same as FIG. 1, and the TMDS transmitter 104 has a block diagram same as FIG. 2. However, the function of the TMDS transmitter 104 is partially extended. The HDMI source instrument 101 corresponds to an exemplary signal transmission device according to the present embodiment. The HDMI sync instrument 201 corresponds to an exemplary reception device according to the present embodiment. The HDMI cable 301 corresponds to an exemplary digital transmission line based on the HDMI standard according to the present embodiment.

Figure 11:
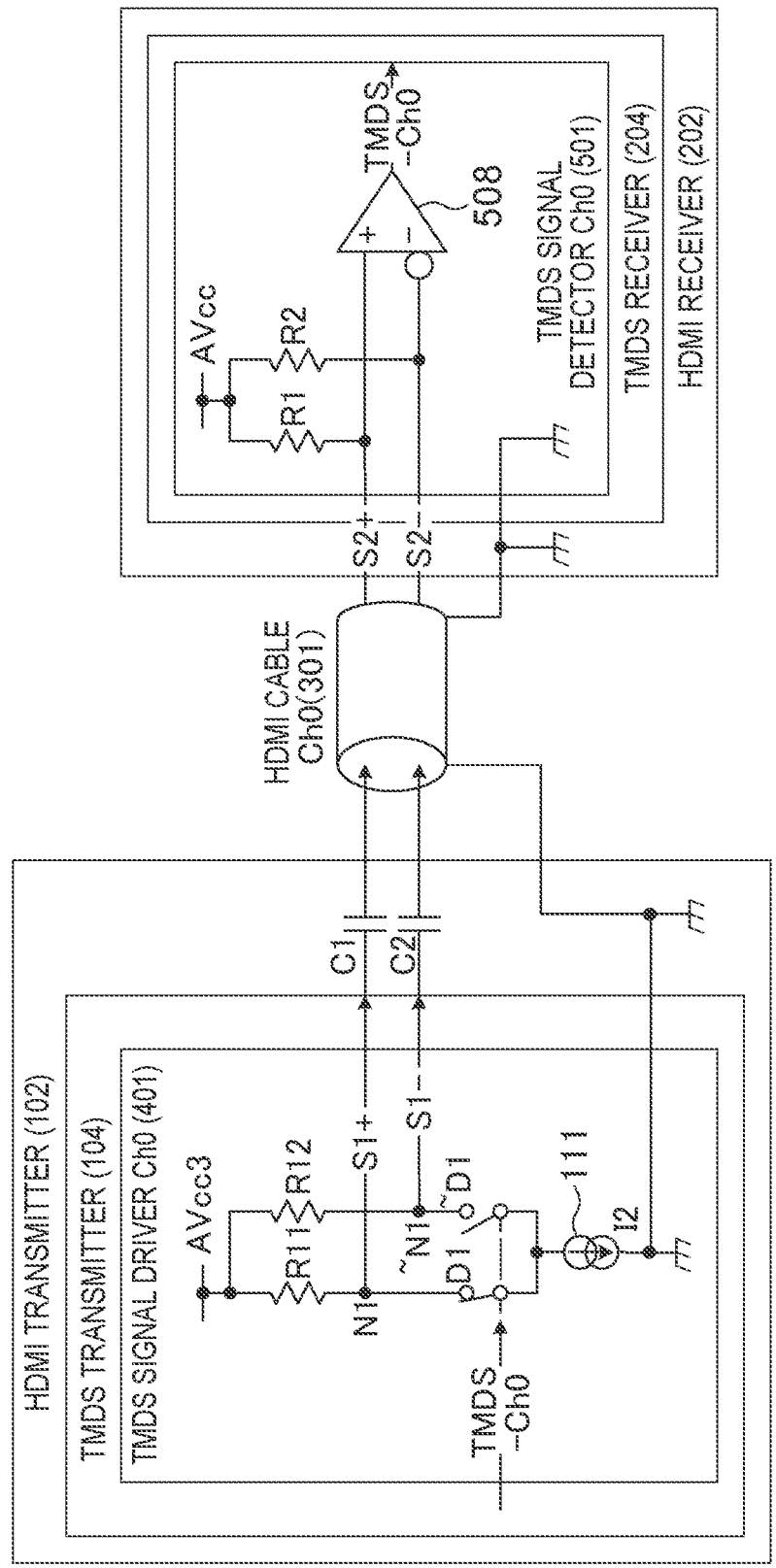
FIG. 11 is a block diagram illustrating an exemplary detailed configuration of the TMDS signal driver in the TMDS transmitter and the TMDS signal detector in the TMDS receiver in an HDMI transmission system according to the present embodiment.

FIG. 11 is a block diagram illustrating an exemplary detailed configuration of the TMDS signal driver of Ch0 in the TMDS transmitter 104 of the HDMI source instrument 101 and the TMDS signal detector 501 of Ch0 in the TMDS receiver 204 of the HDMI sync instrument 201. Although FIG. 11 illustrates the configuration corresponding to Ch0, the same configuration is provided for Ch1, Ch2, and CK.

The block diagram of FIG. 11 is basically same as the block diagram of FIG. 5 according to the AC-coupling configuration described above, but the function of the TMDS transmitter 104 is partially extended. Any element identical or equivalent to that in FIG. 5 is denoted by an identical reference sign and detailed description thereof is omitted. Resistors R11 and R12 are provided in place of the resistors R3 and R4 in FIG. 5. A power source AVcc3 is provided in place of the power source AVcc2 in FIG. 5. A current source 111 is provided in place of the current source 504 in FIG. 5. For example, the resistance values of the resistors R11 and R12 remain same.

A node N1 corresponds to a connection part between the resistor R11 and the switch D1. A node ˜N1 corresponds to a connection part between the resistor R12 and the switch ˜D1. The voltage of the node N1 corresponds to the voltage of a terminal "S1+" or the amplitude of a signal waveform transmitted from the terminal "S1+". The voltage of the node ˜N1 corresponds to the voltage of a terminal "S1−" or the amplitude of a signal waveform transmitted from the terminal "S1−".

The resistance values of the resistors R3 and R4, the voltage of the power source AVcc3, and the current value of the current source 111 are set to such values that the absolute value of the voltage (amplitude) of a transmitted signal from the TMDS signal driver 401 is 857.14 (mV) or larger. According to an HDMI specification (HDMI 1.4b specification), the range of the absolute value of the amplitude of the transmitted signal is 857 (mV) to 1200 (mV) inclusive, and thus the range of 857.14 (mV) to 1200 (mV) inclusive is allowed by the standard. The voltage (amplitude) of the transmitted signal is, for example, the voltage of the node N1 and the voltage of the node ˜N1. The wavelength of the transmitted signal is, for example, 0.85 Tbit or longer as described above.

In the configuration described above, a differential signal including a first signal ("S1+" signal) and a second signal ("S1−" signal) based on an encoded bit serial input signal is transmitted to the HDMI cable 301 (digital transmission line). In this case, the absolute values of the amplitudes of the first and second signals each have are 857.14 (mV) or larger. The amplitude of the differential signal as the difference between the first and second signals is, for example, 686 (mV) or larger. The ratio of logic 1 and logic 0 in number for the encoded bit serial input signal is different from 5:5. The bit serial input signal may be TMDS-encoded. The bit serial input signal is input from the TMDS encoder/parallel-series converter 405 (refer to FIG. 2) corresponding to the TMDS signal driver 401.

A configuration for setting the voltage of the transmitted signal to the above-described range may be optional. For example, variable resistance elements may be used as the resistors R11 and R12, and the resistance values of the variable resistance elements may be adjusted to set the voltage of the transmitted signal to the above-described range. Alternatively, a variable current source may be used as the current source 111, and the current of the variable current source may be adjusted to set the voltage of the transmitted signal to the above-described range. Alternatively, a variable voltage source may be used as the power source AVcc3, and the voltage of the variable voltage source may be adjusted to set the voltage of the transmitted signal to the above-described range.

When the voltage of the transmitted signal is set to the above-described range, the amplitude of a differential input signal to the differential amplifier 508 on the reception side can be reliably held at 150 (mV) or larger. Accordingly, the signal can be normally detected at the differential amplifier 508 when the AC-coupling scheme is used as a scheme of coupling between the HDMI transmitter 102 and the HDMI cable 301.

According to the present embodiment described above, unbalance between DC components, which is attributable to an encoding scheme unique to an HDMI specification can be compensated even when the AC-coupling scheme in which capacitors are inserted between an HDMI transmitter (or HDMI source instrument) and an HDMI cable is used. Thus, it is possible to compliant with an eye pattern defined by the HDMI 1.4b specification at a terminal end of the HDMI cable (reception terminal of an HDMI sync instrument) even when balance between DC components varies during signal transmission. A signal waveform that is compliant with the eye pattern on the reception side, which is defined by HDMI 1.4b, can be provided to a differential amplifier even when the AC-coupling scheme is used. Thus, it is possible to ensure connectibility with a sync instrument that is compliant with HDMI 1.4b. Accordingly, it is possible to apply the AC-coupling scheme to solve a problem with breakdown voltage in a case of a DC-coupling scheme, and it is possible to achieve the HDMI transmitter 102 using a large-scale integrated circuit using a microfabrication technology, thereby enabling faster transmission. Moreover, it is possible to reduce cost of manufacturing the HDMI transmitter 102.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A high-definition media interface (HDMI) signal transmission device alternating-current (AC)-coupled with an HDMI reception device through a digital transmission line conforming to HDMI standard, comprising:
  transmitting circuitry configured to
    generate a first signal of first polarity and a second signal of second polarity based on a bit-serial input signal containing a transition-minimized differential signal (TMDS)-encoded multi-bit code by amplifying each bit according to logic of the bit, and
    transmit a differential signal including the first signal and the second signal over the digital transmission line,
  wherein
    the bit-serial input signal includes a first of the TMDS-encoded multi-bit code has a ratio of 4:6 between bits of logic 1 and bits of logic 0, and a second of the TMDS-encoded multi-bit code has a ratio of 6:4 between bits of logic 1 and bits of logic 0,
    an absolute value of an amplitude of the first signal and the second signal is 857.14 (mV) or larger,
    an amplitude of the differential signal is 686 (mV) or larger, and
    a wavelength of a waveform of each of the first signal and the second signal is 0.85 Tbit (Time duration of a single bit carried across the TMDS data channels) or longer.

2. The signal transmission device according to claim 1, wherein the first of the multi-bit code and the second of the multi-bit code has 10 bits.

3. The HDMI signal transmission device according to claim 1, wherein the first signal of first polarity and the second signal of second polarity are transmitted via a first capacitor and a second capacitor as the AC coupling.

4. A high-definition media interface (HDMI) signal transmission method performed by a signal transmission device alternating-current (AC)-coupled with an HDMI reception device through a digital transmission line conforming to HDMI standard, comprising:
  generating a first signal of first polarity and a second signal of second polarity based on a bit-serial input signal containing a transition-minimized differential signal (TMDS)-encoded multi-bit code by amplifying each bit according to logic of the bit;
  transmitting a differential signal including the first signal and the second signal over the digital transmission line,
    wherein the bit-serial input signal includes a first of the TMDS-encoded multi-bit code has a ratio of 4:6 between bits of logic 1 and bits of logic 0, and a second of the TMDS-encoded multi-bit code has a ratio of 6:4 between bits of logic 1 and bits of logic 0,
  wherein
    an absolute value of an amplitude of the first signal and the second signal is 857.14 (mV) or larger, and
    an amplitude of the differential signal is 686 (mV) or larger, and
    a wavelength of a waveform of each of the first signal and the second signal is 0.85 Tbit (Time duration of a single bit carried across the TMDS data channels) or longer.

5. The method according to claim 4, wherein the first of the multi-bit code and the second of the multi-bit code each has 10 bits.

* * * * *